F. J. GRADY.
ARTICLE FOR ANIMAL WEAR.
APPLICATION FILED SEPT. 21, 1912.

1,122,587.

Patented Dec. 29, 1914.

Witnesses:
A. A. Olson.
B. J. Richards.

Inventor:
Frank J. Grady
by Joshua R. Hoss,
his Attorney.

UNITED STATES PATENT OFFICE.

FRANK J. GRADY, OF VERONA, WISCONSIN.

ARTICLE FOR ANIMAL WEAR.

1,122,587.  Specification of Letters Patent.  Patented Dec. 29, 1914.

Application filed September 21, 1912. Serial No. 721,580.

*To all whom it may concern:*

Be it known that I, FRANK J. GRADY, a citizen of the United States, and a resident of the city of Verona, county of Dane, and State of Wisconsin, have invented certain new and useful Improvements in Articles for Animal Wear, of which the following is a specification.

My invention relates to improvements in articles for animal wear especially adapted for use as animal pokes and more specifically to that class thereof designed for use especially upon cattle to prevent the same from thrusting their heads through wire fences, and the like.

The object of my invention is the production of a device as mentioned, which will be of light and durable construction, one which may be readily and easily applied, one which will afford the greatest comfort to the animal when worn, and one which will be efficient in use. Other objects will appear hereinafter.

The invention consists in the combinations and arrangements of parts hereinafter described and claimed.

Figure 1:
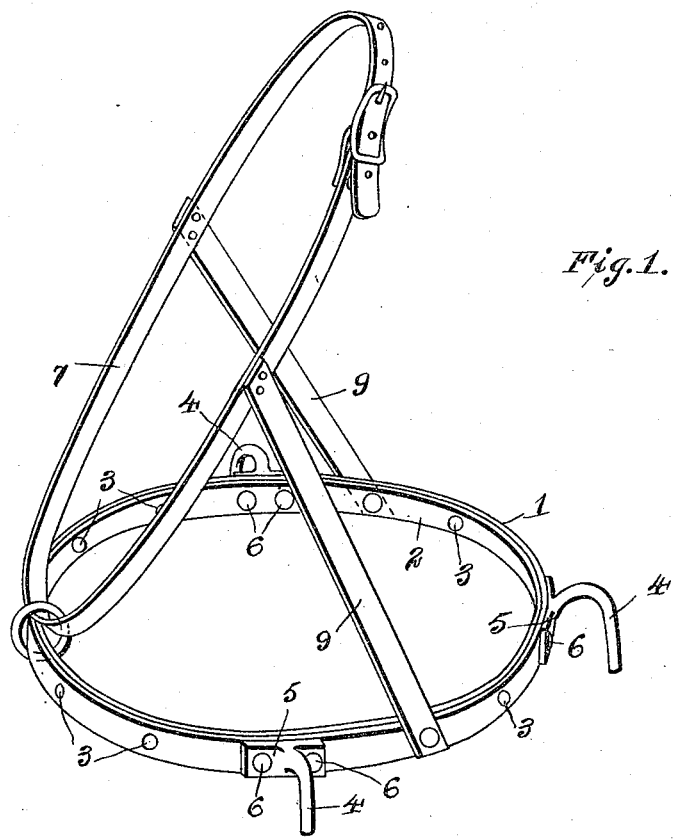
Figure 2:
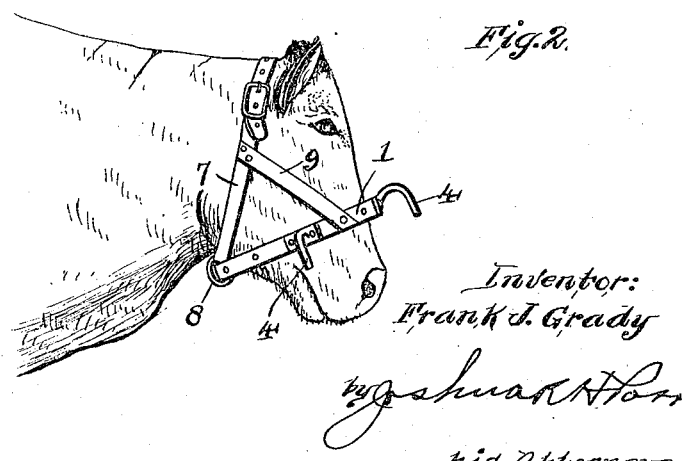

The invention will be best understood by reference to the accompanying drawing forming a part of this specification, and in which, Figure 1 is a perspective view of a cattle poke embodying my invention, and Fig. 2 illustrates the application of the device to the head of a cow.

The preferred form of construction as illustrated in the drawing comprises a nose band which is of oval form and of such dimensions as to adapt the same to loosely embrace the nose of a cow, as shown in Fig. 2. Such nose band consists of an outer rigid metallic body 1 formed preferably of strap iron, and an inner protective lining 2 preferably of leather, which is secured to the body 1 by means of rivets 3, said lining serving to protect the animal when the device is worn, preventing cutting or abrasion by the nose band. Secured to said nose band are outwardly and downwardly projecting tines or hook members 4, there being one provided medially of the front side of the band and two provided at the sides of said band, as clearly shown. Said tines 4 are provided with bases 5 which are secured by rivets 6 to the band. Said tines are adapted, when the device is in use, to engage with the wires of a fence through which the animal attempts to thrust its head and thus to frustrate the attempt.

The nose band is supported upon the head of the animal by means of a flexible adjustable strap 7 preferably of leather which engages a ring 8 provided at the rearward side of the band, said strap being adapted to pass upwardly around the head of the animal, as shown. The front end of the nose band is supported in operative position by means of flexible side straps 9 preferably of leather, which connect said end of said band with the sides of the strap 7.

A device of the construction set forth will be found effective in use and because of the few parts comprised in the construction, comfortable to the animal. And because of the flexible connection between the nose band and the head of the animal, the device readily adjusts itself to the head of the animal, and is rendered applicable for use upon heads of various sizes and shapes.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A halter comprising a neck band; a ring loosely mounted at the lower side of said neck band; a nose band passing loosely through said ring and disposed in a plane inclined to the plane in which said neck band is positioned; and side straps, each strap being rigidly secured at its top to the side of said neck band and at its bottom to the side of said nose band and permanently positioning said nose and neck bands, substantially as described.

In testimony whereof I have signed my name to this specification in the presence of two subscribing witnesses.

FRANK J. GRADY.

Witnesses:
 ALICE GALLAGHER,
 EMERSON ELA.

Copies of this patent may be obtained for five cents each, by addressing the "Commissioner of Patents, Washington, D. C."